(12) United States Patent
Yoshida et al.

(10) Patent No.: US 11,965,105 B2
(45) Date of Patent: Apr. 23, 2024

(54) INK CONTAINING FINE METAL PARTICLES

(71) Applicant: KAO CORPORATION, Tokyo (JP)

(72) Inventors: Tomohide Yoshida, Wakayama (JP); Kosuke Muto, Wakayama (JP)

(73) Assignee: KAO CORPORATION, Tokyo (JP)

( * ) Notice: Subject to any disclaimer, the term of this patent is extended or adjusted under 35 U.S.C. 154(b) by 74 days.

(21) Appl. No.: 17/788,535

(22) PCT Filed: Dec. 24, 2020

(86) PCT No.: PCT/JP2020/048388
§ 371 (c)(1),
(2) Date: Jun. 23, 2022

(87) PCT Pub. No.: WO2021/132446
PCT Pub. Date: Jul. 1, 2021

(65) Prior Publication Data
US 2023/0057712 A1    Feb. 23, 2023

(30) Foreign Application Priority Data

Dec. 27, 2019 (JP) ................................. 2019-239870

(51) Int. Cl.
| | | |
|---|---|---|
| *C09D 11/38* | (2014.01) | |
| *B41M 5/00* | (2006.01) | |
| *C09D 11/326* | (2014.01) | |
| *C09D 11/52* | (2014.01) | |

(52) U.S. Cl.
CPC ............ *C09D 11/38* (2013.01); *B41M 5/00* (2013.01); *C09D 11/326* (2013.01); *C09D 11/52* (2013.01)

(58) Field of Classification Search
CPC ....... C09D 11/52; C09D 11/38; C09D 11/326; C09D 11/106; C09D 11/107; C09D 11/104; C09D 11/322; C09D 11/36; B41J 2/01; B41M 5/00; B41M 5/0023
See application file for complete search history.

(56) References Cited

U.S. PATENT DOCUMENTS

| | | |
|---|---|---|
| 6,114,412 A | 9/2000 | Kanbayashi et al. |
| 2012/0219703 A1* | 8/2012 | Son ................... C09D 5/24 427/123 |
| 2015/0017405 A1 | 1/2015 | André et al. |
| 2020/0017704 A1* | 1/2020 | Yang .................. C08K 5/101 |

FOREIGN PATENT DOCUMENTS

| | | |
|---|---|---|
| CN | 103998534 A | 8/2014 |
| CN | 110461101 A | 11/2019 |
| EP | 0 556 649 A1 | 8/1993 |
| EP | 2 608 217 A1 | 6/2013 |
| JP | 04-126782 A | 4/1992 |
| JP | 10-120963 A | 5/1998 |
| JP | 2007-207577 A | 8/2007 |
| JP | 2009-74171 A | 4/2009 |
| JP | 2009-227736 A | 10/2009 |
| JP | 2012-207049 A | 10/2012 |
| JP | 2013-508934 A | 3/2013 |
| JP | 2014-210847 A | 11/2014 |
| JP | 2016-056300 A | 4/2016 |
| JP | 2016-168584 A | 9/2016 |
| JP | 2018-154806 A | 10/2018 |
| WO | WO 2005/025787 A1 | 3/2005 |
| WO | WO 2015/129466 A1 | 9/2015 |
| WO | WO 2019/022239 | 1/2019 |

OTHER PUBLICATIONS

International Search Report dated Mar. 16, 2021 in PCT/JP2020/048388 filed on Dec. 24, 2020, 3 pages.
Official communication issued on Dec. 15, 2023, in corresponding European Application No. 20905208.3.

\* cited by examiner

*Primary Examiner* — Thinh H Nguyen
(74) *Attorney, Agent, or Firm* — Oblon, McClelland, Maier & Neustadt, L.L.P.

(57) ABSTRACT

A metal fine particle-containing ink that contains metal fine particles dispersed therein with a polymer dispersant, a low-molecular weight carboxylic acid and an aqueous solvent, wherein the polymer dispersant contains a constitutional unit derived from an acid group-containing monomer; a content of the low-molecular weight carboxylic acid C in the ink is not less than 1% by mass and not more than 15% by mass. A boiling point (C) of the low-molecular weight carboxylic acid and a boiling point (D) of the aqueous solvent satisfy the following relational formula (I); and an acid dissociation exponent pKa (C) of the low-molecular weight carboxylic acid and an acid dissociation exponent pKa (B) of an acid group in the polymer dispersant satisfy the following relational formula (II):

$$\text{boiling point }(C) > \text{boiling point }(D) \qquad \text{(I), and}$$

$$\text{pKa }(C) < \text{pKa }(B) \qquad \text{(II).}$$

19 Claims, No Drawings

INK CONTAINING FINE METAL PARTICLES

CROSS-REFERENCE TO RELATED APPLICATIONS

The present application is a 35 U.S.C. § 371 national stage application of International patent application PCT/JP2020/048388, filed Dec. 24, 2020, which is based on and claims the benefit of priority to Japanese Application No. 2019-239870, filed Dec. 27, 2019. The entire contents of these applications are incorporated herein by reference.

FIELD OF THE INVENTION

The present invention relates to a metal fine particle-containing ink and a method for producing a printed material using the ink.

BACKGROUND OF THE INVENTION

Metal fine particles obtained by atomizing a metal into fine particles having a nano-order size are capable of exhibiting a variety of functions and properties upon use, and therefore a wide variety of studies have been made to use the metal fine particles in extensive industrial applications.

It is known that the metal fine particles are capable of providing a design having a metallic luster when used in printing. With the widespread of printing application fields including commercial printing, industrial printing, etc., for packaging of goods, advertisements, etc., studies have been made to improve properties of an ink containing the metal fine particles.

For example, JP 2009-74171A (Patent Literature 1) aims at providing a liquid dispersion containing metal colloid particles, etc., and discloses metal colloid particles that are constructed of metal nanoparticles and a protective colloid with which the respective metal nanoparticles are coated, in which the protective colloid is constituted of a carboxy group-containing organic compound and a polymer dispersant. In the Patent Literature 1, it is described that the metal colloid particles are useful for typing or printing characters or images which are excellent in metallic luster without being subjected to heating or light-irradiation treatments.

WO 2005/025787A (Patent Literature 2) discloses a metal nanoparticle liquid dispersion that is capable of being injected in the form of fine droplets and being applied in a laminated state, in which when the metal nanoparticle liquid dispersion prepared by dispersing metal nanoparticles having an average particle size of 1 to 100 nm in a dispersion solvent having a boiling point of not lower than 80° C. is injected in the form of fine droplets by an ink-jetting method, etc., while selectively controlling a volume ratio of the dispersion solvent and a liquid viscosity (at 20° C.) of the resulting liquid dispersion to respective specific ranges, it is possible to apply the metal nanoparticle liquid dispersion as a viscous liquid dispersion in a laminated state.

WO 2015/129466A (Patent Literature 3) aims at providing copper nanoparticles that have high dispersibility, and are capable of undergoing low-temperature sintering and removing a protective layer therefrom upon conducting the low-temperature sintering at a temperature of not higher than 150° C., and can be suitably used as a material for a conductive copper nano-ink, a copper nanoparticle liquid dispersion, and a copper nano-ink containing the copper nanoparticle liquid dispersion, and discloses copper nanoparticles that are respectively formed of a central portion constituted of a copper single crystal and a protective layer surrounding the central portion, in which an average particle size of the copper nanoparticles is not more than 10 nm, the protective layer contains at least one compound selected from the group consisting of a primary alcohol or secondary alcohol having 3 to 6 carbon atoms and derivatives thereof, and a boiling point or a heat decomposition temperature of the protective layer is not higher than 150° C.

SUMMARY OF THE INVENTION

The present invention relates to a metal fine particle-containing ink that contains metal fine particles (a) dispersed therein with a polymer dispersant B, a low-molecular weight carboxylic acid C and an aqueous solvent D, in which:

the polymer dispersant B contains a constitutional unit derived from an acid group-containing monomer (b-1);

a content of the low-molecular weight carboxylic acid C in the ink is not less than 1% by mass and not more than 15% by mass;

a boiling point (C) of the low-molecular weight carboxylic acid C and a boiling point (D) of the aqueous solvent D satisfy the following relational formula (I); and an acid dissociation exponent pKa (C) of the low-molecular weight carboxylic acid C and an acid dissociation exponent pKa (B) of an acid group in the polymer dispersant B satisfy the following relational formula (II), boiling point $(C)$>boiling point $(D)$     (I), and pKa $(C)$<pKa $(B)$     (II).

DETAILED DESCRIPTION OF THE INVENTION

Hitherto, in the case where a metal coating film is produced from an ink containing metal fine particles, there has been adopted the method of sintering the metal fine particles under high-temperature conditions. However, with the spread of applications of a printed material on which the metal coating film is formed, it has been demanded to provide a metal fine particle-containing ink that allows the metal fine particles contained therein to undergo accelerated sintering even when producing the metal coating film therefrom under ordinary-temperature environmental conditions to thereby obtain the printed material that is excellent in electrical conductivity.

In the Patent Literature 1, it is described that a low-resistance metal film, etc., can be obtained even when sintered at a low temperature. However, in Example 1 of the Patent Literature 1, a paste having a silver concentration of 80% prepared by adding ethylene glycol to silver colloid particles was applied onto a glass substrate, and sintered at 150° C. or 250° C. for 30 minutes. Therefore, the Patent Literature 1 has failed to meet a high demand for the ordinary-temperature sintering properties.

In the Patent Literature 2, it is described that when the heat treatment temperature in the course of low-temperature sintering is controlled to not higher than 300° C., preferably not higher than 250° C., it is possible to form an electrical conductor layer. In Examples of the Patent Literature 2, it is described that a coating layer of silver nanoparticles on a glass substrate was heat-treated at 240° C. for 1 hour to subject the layer of the silver nanoparticles to sintering treatment and thereby obtain a layer of a sintered body of the silver nanoparticles. Therefore, the Patent Literature 2 has also failed to meet the high demand for the ordinary-temperature sintering properties.

In the Patent Literature 3, it is described that the protective layer of the respective nanoparticles can be removed upon the low-temperature sintering conducted at a temperature of not higher than 150° C., and it was confirmed that a paste of the copper nanoparticles underwent the low-temperature sintering even at a temperature of about 80° C. However, the Patent Literature 3 has also failed to satisfy the high demand for the ordinary temperature sintering properties.

The present invention relates to a metal fine particle-containing ink that is capable of providing a printed material on which a metal coating film that is excellent in ordinary-temperature sintering properties and has high electrical conductivity is formed even when printed on a non-liquid-absorbing printing substrate, and a method for producing a printed material using the ink.

Meanwhile, in the present invention, the term "ordinary-temperature sintering properties" as used herein means that the metal fine particles can exhibit electrical conductivity by undergoing necking therebetween and being bonded to each other under ordinary-temperature (in a temperature range of not lower than 5° C. and not higher than 45° C.) environmental conditions.

In addition, in the present invention, the term "non-liquid absorbing" as used herein is a concept including both of low-liquid absorbing properties and non-liquid absorbing properties of a printing substrate, and means that when using a water absorption of the printing substrate as measured by contacting the printing substrate with pure water for 100 milliseconds as an index, the water absorption is not less than 0 g/m$^2$ and not more than 10 g/m$^2$. The water absorption may be measured using an automatic scanning absorptometer (for example, "KM500win" available from Kumagai Riki Kogyo Co., Ltd.) in terms of an amount of pure water transferred to the printing substrate when contacting the printing substrate with pure water for 100 milliseconds at 23° C. under a relative humidity of 50%.

The present inventors have noticed that by using an ink containing metal fine particles dispersed therein with an acid group-containing polymer dispersant, a low-molecular weight carboxylic acid and an aqueous solvent and controlling physicochemical characteristic values and amounts of the polymer dispersant, the low-molecular weight carboxylic acid and the aqueous solvent so as to establish specific relationships therebetween, the resulting metal coating film is capable of exhibiting good ordinary-temperature sintering properties and high electrical conductivity even when printed on a non-liquid absorbing printing substrate, and as a result, the present inventors have found that with such a knowledge, it is possible to provide a metal fine particle-containing ink capable of producing a printed material on which a metal coating film that is excellent in ordinary-temperature sintering properties and can exhibit high electrical conductivity is formed, even when printed on a non-liquid absorbing printing substrate, and a method for producing a printed material using the ink.

That is, the present invention relates to the following aspects [1] and [2].

[1] A metal fine particle-containing ink that contains metal fine particles (a) dispersed therein with a polymer dispersant B, a low-molecular weight carboxylic acid C and an aqueous solvent D, in which:
the polymer dispersant B contains a constitutional unit derived from an acid group-containing monomer (b-1);
a content of the low-molecular weight carboxylic acid C in the ink is not less than 1% by mass and not more than 15% by mass;
a boiling point (C) of the low-molecular weight carboxylic acid C and a boiling point (D) of the aqueous solvent D satisfy the following relational formula (I); and
an acid dissociation exponent pKa (C) of the low-molecular weight carboxylic acid C and an acid dissociation exponent pKa (B) of an acid group in the polymer dispersant B satisfy the following relational formula (II), $$\text{boiling point }(C) > \text{boiling point }(D) \qquad \text{(I), and}$$

$$\text{pKa }(C) < \text{pKa }(B) \qquad \text{(II).}$$

[2] A method for producing a printed material, including the step of applying the metal fine particle-containing ink according to the above aspect [1] to a printing substrate to form a metal coating film of the ink on the printing substrate under ordinary-temperature environmental conditions, thereby obtaining the printed material.

In accordance with the present invention, it is possible to provide a metal fine particle-containing ink that is capable of producing a printed material on which a metal coating film that is excellent in ordinary-temperature sintering properties and can exhibit high electrical conductivity is formed, even when printed on a non-liquid absorbing printing substrate, and a method for producing a printed material using the ink.

[Metal Fine Particle-Containing Ink]

The metal fine particle-containing ink of the present invention contains metal fine particles (a) dispersed therein with a polymer dispersant B, a low-molecular weight carboxylic acid C and an aqueous solvent D, in which:
the polymer dispersant B contains a constitutional unit derived from an acid group-containing monomer (b-1);
a content of the low-molecular weight carboxylic acid C in the ink is not less than 1% by mass and not more than 15% by mass;
a boiling point (C) of the low-molecular weight carboxylic acid C and a boiling point (D) of the aqueous solvent D satisfy the following relational formula (I); and
an acid dissociation exponent pKa (C) of the low-molecular weight carboxylic acid C and an acid dissociation exponent pKa (B) of an acid group in the polymer dispersant B satisfy the following relational formula (II), $$\text{boiling point }(C) > \text{boiling point }(D) \qquad \text{(I), and}$$

$$\text{pKa }(C) < \text{pKa }(B) \qquad \text{(II).}$$

Incidentally, the acid dissociation exponent pKa as used in the present invention means an acid dissociation exponent as measured at 25° C., and in the case where the acid dissociation includes a plurality of dissociation stages, it means the first-stage acid dissociation exponent.

The acid dissociation exponent pKa means the value of common logarithm of an inverse number of an acid dissociation constant (Ka) (−log Ka) which is described in "The Chemical Society of Japan, Handbook of Chemistry, Pure Chemistry II, Revised 4th Edition", published by MARUZEN Publishing Co., Ltd. If no value concerning the acid dissociation exponent pKa is found in the aforementioned literature, the acid dissociation exponent pKa may also be determined by the method described in F. R. Hartley, C. Burgess and R. M. Alcocok, "Solution Equilibria", John Wilery (1980) using a pH meter "F-23" (temperature: 25° C.) commercially available from HORIBA Ltd., etc.

According to the present invention, it is possible to obtain a printed material that is excellent in ordinary-temperature sintering properties and can exhibit high electrical conductivity. The reason why the aforementioned advantageous effects can be attained by the present invention is considered as follows, though it is not clearly determined yet.

That is, the metal fine particle-containing ink of the present invention contains the metal fine particles dispersed therein with the polymer dispersant, the low-molecular weight carboxylic acid and the aqueous solvent, and a boiling point of the low-molecular weight carboxylic acid is higher than a boiling point of the aqueous solvent. For this reason, when the metal fine particle-containing ink is applied onto a non-liquid absorbing printing substrate to form a coating film of the ink on the printing substrate, the aqueous solvent is first vaporized and removed from the ink coating film by drying the ink under ordinary temperature conditions, so that the low-molecular weight carboxylic acid contained in the ink coating film is concentrated. Since the acid dissociation exponent of the low-molecular weight carboxylic acid contained in the ink coating film is lower than the acid dissociation exponent of an acid group in the polymer dispersant, i.e., since the low-molecular weight carboxylic acid is a stronger acid than the polymer dispersant, the low-molecular weight carboxylic acid having a higher affinity to the metal is adsorbed onto the surface of the metal fine particles, so that the polymer dispersant is desorbed from the surface of the metal fine particles. When the drying of the ink is allowed to further proceed, it is suggested that the low-molecular weight carboxylic acid is discharged from the ink coating film, whereby the metal fine particles are contacted with each other and subjected to ordinary-temperature sintering therebetween, which results in exhibition of electrical conductivity.

Meanwhile, if the content of the low-molecular weight carboxylic acid in the metal fine particle-containing ink is large, the low-molecular weight carboxylic acid tends to remain in the dried ink coating film, so that the resulting printed material tends to be deteriorated in ordinary-temperature sintering properties, fail to exhibit good electrical conductivity, and therefore have high surface resistivity.

In addition, if the content of the low-molecular weight carboxylic acid in the metal fine particle-containing ink is large, the polymer dispersant tends to be hardly adsorbed onto the surface of the metal in the ink, so that the metal fine particles tend to be deteriorated in dispersion stability. Therefore, the metal fine particle-containing ink when used in ink-jet printing tends to be deteriorated in ejection stability. In the present invention, since the content of the low-molecular weight carboxylic acid in the metal fine particle-containing ink is controlled to the predetermined range, it is considered that the resulting printed material is excellent in ordinary-temperature sintering properties and has high electrical conductivity, and further the metal fine particle-containing ink can exhibit excellent ejection stability.

<Metal Fine Particles (a)>

The metal fine particle-containing ink of the present invention contains the metal fine particles (a) dispersed therein with the polymer dispersant B (hereinafter also referred to merely as "metal fine particles (a)").

Examples of the metal (metal atom) constituting the metal fine particles (a) include Group 4 transition metals, such as titanium, zirconium, etc.; Group 5 transition metals, such as vanadium, niobium, etc.; Group 6 transition metals, such as chromium, molybdenum, tungsten, etc.; Group 7 transition metals, such as manganese, technetium, rhenium, etc.; Group 8 transition metals, such as iron, ruthenium, etc.; Group 9 transition metals, such as cobalt, rhodium, iridium, etc.; Group 10 transition metals, such as nickel, palladium, platinum, etc.; Group 11 transition metals, such as copper, silver, gold, etc.; Group 12 transition metals, such as zinc, cadmium, etc.; Group 13 metals, such as aluminum, gallium, indium, etc.; Group 14 metals, such as germanium, tin, lead, etc.; and the like. As the metal constituting the metal fine particles (a), one kind of metal may be used alone as a single metal, or two or more kinds of metals may be used in combination with each other.

Among these metals, preferred are those transition metals belonging to Groups 4 to 11 in the 4th to 6th Periods of the Periodic Table, more preferred are copper as well as noble metals, such as gold, silver, platinum, palladium, etc., even more preferred is at least one Group 11 transition metal selected from the group consisting of copper, silver and gold, and further even more preferred is silver.

The kind of metal used herein may be determined by inductively coupled plasma atomic emission spectroscopy.

The average particle size of the metal fine particles (a) contained in the metal fine particle-containing ink is preferably not less than 5 nm, more preferably not less than 10 nm, even more preferably not less than 15 nm and further even more preferably not less than 20 nm, and is also preferably not more than 100 nm, more preferably not more than 80 nm, even more preferably not more than 60 nm and further even more preferably not more than 40 nm, from the viewpoint of improving ordinary-temperature sintering properties of the metal fine particles to thereby improve electrical conductivity of the resulting printed material as well as from the viewpoint of improving ejection stability of the resulting metal fine particle-containing ink.

The average particle size may be measured by the method described in Examples below.

The content of the metal in the metal fine particle-containing ink is preferably not less than 1% by mass, more preferably not less than 5% by mass, even more preferably not less than 7% by mass, further even more preferably not less than 10% by mass, still further even more preferably not less than 20% by mass and furthermore preferably not less than 30% by mass from the viewpoint of improving ordinary-temperature sintering properties of the metal fine particles to thereby improve electrical conductivity of the resulting printed material, and is also preferably not more than 70% by mass, more preferably not more than 60% by mass and even more preferably not more than 50% by mass from the viewpoint of improving dispersion stability of the metal fine particles to thereby improve ejection stability of the resulting metal fine particle-containing ink.

The content of the metal in the ink may be measured by the method described in Examples below.

<Polymer Dispersant B>

In the present invention, from the viewpoint of improving ordinary-temperature sintering properties of the metal fine particles to thereby improve electrical conductivity of the resulting printed material as well as from the viewpoint of improving dispersion stability of the metal fine particles to thereby improve ejection stability of the resulting metal fine particle-containing ink, the polymer dispersant B (hereinafter also referred to as a "dispersant B") contains a constitutional unit derived from an acid group-containing monomer (b-1) (hereinafter also referred to merely as a "monomer (b-1)").

Examples of the acid group contained in the monomer (b-1) include groups that are capable of releasing hydrogen ions upon dissociation thereof to allow the polymer to exhibit acidity, such as a carboxy group (—COOM), a sulfonic acid group (—$SO_3M$), a phosphoric acid group (—$OPO_3M_2$), etc., or dissociated ion forms of these groups (such as —$COO^-$, —$SO_3^-$; —$OPO_3^{-2}$ and —$OPO_3^-M$); and the like. In the aforementioned chemical formulae, M represents a hydrogen atom, an alkali metal, ammonium or an organic ammonium.

In the present invention, the dispersant B contains the acid group derived from the acid group-containing monomer (b-1). The acid dissociation exponent pKa (B) of the acid group in the dispersant B satisfies the aforementioned relational formula (II) in relation to the acid dissociation exponent pKa (C) of the low-molecular weight carboxylic acid C from the viewpoint of improving ordinary-temperature sintering properties of the metal fine particles to thereby improve electrical conductivity of the resulting printed material as well as from the viewpoint of improving dispersion properties of the metal fine particles to thereby improve ejection stability of the resulting metal fine particle-containing ink.

From the same viewpoint as described above, the aforementioned pKa (B) is preferably not less than 2, more preferably not less than 3 and even more preferably not less than 4, and is also preferably not more than 5.5, more preferably not more than 5 and even more preferably not more than 4.5.

As the basic structure of the dispersant B, there may be mentioned a vinyl polymer, such as an acrylic resin, a styrene-based resin, a styrene-acrylic resin, an acrylic silicone-based resin, etc.; a condensation-based polymer, such as a polyester, a polyurethane, etc.; and the like. Among these polymers, preferred is a vinyl polymer.

These dispersants B may be used alone or in combination of any two or more thereof.

In addition, in the case where the dispersant B is in the form of a copolymer, the copolymer may be any of a block copolymer, a random copolymer and an alternating copolymer.

The dispersant B may be either water-soluble or water-insoluble. However, from the viewpoint of improving ordinary-temperature sintering properties of the metal fine particles to thereby improve electrical conductivity of the resulting printed material as well as from the viewpoint of improving dispersion properties of the metal fine particles to thereby improve ejection stability of the resulting metal fine particle-containing ink, the dispersant B is preferably a water-soluble polymer, more preferably at least one polymer selected from the group consisting of a water-soluble vinyl polymer, a water-soluble polyester and a water-soluble polyurethane, and even more preferably a water-soluble vinyl polymer.

The term "water-soluble" of the dispersant B as used in the present invention means that when the polymer is dried to a constant weight at 105° C. for 2 hours and then dissolved in 100 g of water at 25° C., a solubility in water of the polymer is more than 10 g. The term "water-insoluble" of the dispersant B as used herein means that when the polymer is dried to a constant weight at 105° C. for 2 hours and then dissolved in 100 g of water at 25° C., a solubility in water of the polymer is not more than 10 g. The solubility of the dispersant B means a solubility in water of the dispersant B whose acid groups are neutralized completely, i.e., 100%, with sodium hydroxide.

From the same viewpoint as described above, the dispersant B is preferably a water-soluble vinyl polymer containing the constitutional unit derived from the acid group-containing monomer (b-1), and more preferably a water-soluble vinyl polymer containing the constitutional unit derived from the acid group-containing monomer (b-1) and a constitutional unit derived from a polyalkylene glycol segment-containing monomer (b-2) (hereinafter also referred to merely as a "monomer (b-2)").

[Acid Group-Containing Monomer (b-1)]

From the viewpoint of improving ordinary-temperature sintering properties of the metal fine particles to thereby improve electrical conductivity of the resulting printed material as well as from the viewpoint of improving dispersion properties of the metal fine particles to thereby improve ejection stability of the resulting metal fine particle-containing ink, specific examples of the monomer (b-1) include unsaturated monocarboxylic acids, such as (meth)acrylic acid, crotonic acid, 2-methacryloyloxymethylsuccinic acid, etc.; unsaturated dicarboxylic acids, such as maleic acid, itaconic acid, fumaric acid, citraconic acid, etc.; and the like. Incidentally, the aforementioned unsaturated dicarboxylic acids may be in the form of an anhydride thereof. These monomers (b-1) may be used alone or in combination of any two or more thereof.

The monomer (b-1) is preferably at least one monomer selected from the group consisting of (meth)acrylic acid and maleic acid, and more preferably (meth)acrylic acid, from the same viewpoint as described above.

The term "(meth)acrylic acid" as used in the present specification means at least one compound selected from the group consisting of acrylic acid and methacrylic acid, and the "(meth)acrylic acid" is hereinlater also defined in the same way.

[Polyalkylene Glycol Segment-Containing Monomer (b-2)]

The monomer (b-2) is preferably a monomer that is capable of introducing a polyalkylene glycol segment into the dispersant B as a side chain of the dispersant B from the viewpoint of improving ordinary-temperature sintering properties of the metal fine particles to thereby improve electrical conductivity of the resulting printed material as well as from the viewpoint of improving dispersion properties of the metal fine particles to thereby improve ejection stability of the resulting metal fine particle-containing ink. Examples of such a monomer include polyalkylene glycol monoesters of (meth)acrylic acid, and the like. These monomers (b-2) may be used alone or in combination of any two or more thereof.

The polyalkylene glycol segment of the monomer (b-2) preferably contains a unit derived from an alkyleneoxide having not less than 2 and not more than 4 carbon atoms. Examples of the alkyleneoxide include ethyleneoxide, propyleneoxide, butyleneoxide and the like.

The number of the repeating units derived from the alkyleneoxide in the aforementioned polyalkylene glycol segment is preferably not less than 2, more preferably not less than 5 and even more preferably not less than 10, and is also preferably not more than 100, more preferably not more than 70 and even more preferably not more than 50.

The aforementioned polyalkylene glycol segment is preferably a copolymer containing a unit derived from ethyleneoxide and a unit derived from propyleneoxide from the same viewpoint as described above. The molar ratio of the ethyleneoxide unit (EO) to the propyleneoxide unit (PO) [EO/PO] is preferably not less than 60/40, more preferably not less than 65/35 and even more preferably not less than 70/30, and is also preferably not more than 90/10, more preferably not more than 85/15 and even more preferably not more than 80/20.

The copolymer containing the unit derived from ethyleneoxide and the unit derived from propyleneoxide may be in the form of any of a block copolymer, a random copolymer and an alternating copolymer.

Specific examples of commercially available products of the monomer (b-2) include "NK ESTER AM-90G", "NK ESTER AM-130G", "NK ESTER A1VIP-20GY", "NK ESTER AM-230G", "NK ESTER M-20G", "NK ESTER M-40G", "NK ESTER M-90G", "NK ESTER M-230G" and the like as products available from Shin-Nakamura Chemical Co., Ltd.; and "BLEMMER PE-90", "BLEMMER PE-200", "BLEMMER PE-350" and the like, "BLEMMER PME-100", "BLEMMER PME-200", "BLEMMER PME-400", "BLEMMER PME-1000", "BLEMMER PME-4000" and the like, "BLEMMER PP-500", "BLEMMER PP-800", "BLEMMER PP-1000" and the like, "BLEMMER AP-150", "BLEMMER AP-400", "BLEMMER AP-550" and the like, and "BLEMMER 50PEP-300", "BLEMMER 50POEP-800B", "BLEMMER 43PAPE-600B" and the like as products available from NOF Corporation.

[Hydrophobic Monomer (b-3)]

The dispersant B is preferably a water-soluble vinyl polymer further containing a constitutional unit derived from a hydrophobic monomer (b-3) (hereinafter also referred to merely as a "monomer (b-3)") in addition to the constitutional units derived from the monomer (b-1) and the monomer (b-2) from the viewpoint of improving ordinary-temperature sintering properties of the metal fine particles to thereby improve electrical conductivity of the resulting printed material as well as from the viewpoint of improving dispersion properties of the metal fine particles to thereby improve ejection stability of the resulting metal fine particle-containing ink.

The term "hydrophobic" of the monomer (b-3) as used in the present invention means that a solubility in water of the monomer as measured by dissolving the monomer in 100 g of ion-exchanged water at 25° C. until reaching a saturation concentration thereof is less than 10 g. The solubility in water of the monomer (b-3) is preferably not more than 5 g and more preferably not more than 1 g from the same viewpoint as described above.

The monomer (b-3) is preferably at least one monomer selected from the group consisting of an aromatic group-containing monomer and a (meth)acrylate containing a hydrocarbon group derived from an aliphatic alcohol having not less than 1 and not more than 22 carbon atoms, and more preferably an aromatic group-containing monomer.

The term "(meth)acrylate" as used in the present specification means at least one compound selected from the group consisting of an acrylate and a methacrylate, and the "(meth)acrylate" is hereinafter also defined in the same way.

These monomers (b-3) may be used alone or in combination of any two or more thereof.

The aromatic group-containing monomer is preferably a vinyl monomer containing an aromatic group having not less than 6 and not more than 22 carbon atoms which may contain a substituent group containing a hetero atom, and more preferably at least one monomer selected from the group consisting of a styrene-based monomer and an aromatic group-containing (meth)acrylate. The molecular weight of the aromatic group-containing monomer is preferably less than 500.

Examples of the styrene-based monomer include styrene, α-methyl styrene, 2-methyl styrene, 4-methyl styrene, divinyl benzene and the like. Among these styrene-based monomers, preferred are styrene and α-methyl styrene.

As the aromatic group-containing (meth)acrylate, preferred are phenyl (meth)acrylate, benzyl (meth) acrylate, phenoxyethyl (meth)acrylate, etc., and more preferred is benzyl (meth)acrylate.

As the monomer (b-3), from the same viewpoint as described above, even more preferred is the styrene-based monomer, further even more preferred is at least one monomer selected from the group consisting of styrene, α-methyl styrene, 2-methyl styrene and 4-methyl styrene, and still further even more preferred is at least one monomer selected from the group consisting of styrene and α-methyl styrene.

(Contents of Respective Monomers in Raw Material Monomers or Contents of Respective Constitutional Units in Dispersant B)

The contents of the aforementioned monomers (b-1) to (b-3) in the raw material monomers (contents of non-neutralized components; hereinafter defined in the same way) upon production of the dispersant B, or the contents of the constitutional units derived from the monomers (b-1) to (b-3) in the dispersant B, are as follows, from the viewpoint of improving ordinary-temperature sintering properties of the metal fine particles to thereby improve electrical conductivity of the resulting printed material as well as from the viewpoint of improving dispersion properties of the metal fine particles to thereby improve ejection stability of the resulting metal fine particle-containing ink.

The content of the monomer (b-1) is preferably not less than 5 mol %, more preferably not less than 10 mol % and even more preferably not less than 15 mol %, and is also preferably not more than 40 mol %, more preferably not more than 35 mol % and even more preferably not more than 30 mol %.

The content of the monomer (b-2) is preferably not less than 1 mol %, more preferably not less than 5 mol % and even more preferably not less than 7 mol %, and is also preferably not more than 30 mol %, more preferably not more than 20 mol % and even more preferably not more than 15 mol %.

The content of the monomer (b-3) is preferably not less than 50 mol %, more preferably not less than 60 mol % and even more preferably not less than 65 mol %, and is also preferably not more than 90 mol %, more preferably not more than 85 mol % and even more preferably not more than 80 mol %.

The dispersant B is preferably a water-soluble vinyl polymer that contains a constitutional unit derived from (meth)acrylic acid as the monomer (b-1) and a constitutional unit derived from a polyalkylene glycol monoester of (meth) acrylic acid as the monomer (b-2), and more preferably a water-soluble vinyl polymer that contains the constitutional unit derived from (meth)acrylic acid as the monomer (b-1), the constitutional unit derived from a polyalkylene glycol monoester of (meth)acrylic acid as the monomer (b-2) and a constitutional unit derived from a styrene-based monomer as the monomer (b-3).

As the dispersant B, there may be used either a copolymer obtained by copolymerizing the raw material monomers containing the monomer (b-1), the monomer (b-2) and the monomer (b-3) by conventionally known methods, or a commercially available product. Examples of the commercially available product of the dispersant B include "DISPERBYK-190" and "DISPERBYK-2015" both available from BYK Chemie GmbH, and the like.

The number-average molecular weight of the dispersant B is preferably not less than 1,000, more preferably not less than 2,000 and even more preferably not less than 3,000, and is also preferably not more than 100,000, more preferably not more than 50,000, even more preferably not more than 30,000, further even more preferably not more than 10,000 and still further even more preferably not more than 7,000. When the number-average molecular weight of the dispersant B lies within the aforementioned range, adsorptivity of the dispersant B onto the metal fine particles is sufficient, so that the metal fine particles can be improved in dispersion stability. In addition, upon drying the ink coating film, desorption of the dispersant B from the metal fine particles is promoted, so that it is possible to improve ordinary-temperature sintering properties of the metal fine particles and thereby allow the resulting printed material to exhibit high electrical conductivity.

The number-average molecular weight of the dispersant B may be measured by gel permeation chromatography using monodisperse polystyrenes having previously known molecular weights as a reference standard substance.

The acid value of the dispersant B is preferably not less than 5 mgKOH/g, more preferably not less than 10 mgKOH/g and even more preferably not less than 15 mgKOH/g, and is also preferably not more than 200 mgKOH/g, more preferably not more than 100 mgKOH/g, even more preferably not more than 50 mgKOH/g and further even more preferably not more than 30 mgKOH/g.

The acid value of the dispersant B may be measured by the same method as defined in JIS K 0070 except that only a mixed solvent of ethanol and an ether prescribed as a measuring solvent in JIS K 0070 is replaced with a mixed solvent containing acetone and toluene at a volume ratio [acetone:toluene] of 4:6.

Examples of the configuration of the dispersant B in the metal fine particle-containing ink include the configuration in which the dispersant B is adsorbed onto the respective metal fine particles (a), the metal fine particle-enclosing (-encapsulating) configuration in which the metal fine particles (a) are incorporated in the dispersant B, the configuration in which the dispersant B is not adsorbed onto the respective metal fine particles (a), and mixed configurations thereof. Among these configurations, from the viewpoint of improving ordinary-temperature sintering properties of the metal fine particles to thereby improve electrical conductivity of the resulting printed material as well as from the viewpoint of improving dispersion properties of the metal fine particles to thereby improve ejection stability of the resulting metal fine particle-containing ink, preferred is the configuration in which the dispersant B is adsorbed onto the respective metal fine particles (a) or the metal fine particle-enclosing (-encapsulating) configuration in which the metal fine particles (a) are incorporated in the dispersant B.

The total content of the dispersant B and the metal in the metal fine particle-containing ink is preferably not less than 1% by mass, more preferably not less than 5% by mass, even more preferably not less than 7% by mass, further even more preferably not less than 10% by mass, still further even more preferably not less than 20% by mass and furthermore preferably not less than 30% by mass, and is also preferably not more than 78% by mass, more preferably not more than 70% by mass, even more preferably not more than 60% by mass and further even more preferably not more than 50% by mass, from the viewpoint of improving ordinary-temperature sintering properties of the metal fine particles to thereby improve electrical conductivity of the resulting printed material as well as from the viewpoint of improving dispersion properties of the metal fine particles to thereby improve ejection stability of the resulting metal fine particle-containing ink.

The mass ratio of the dispersant B to a sum of the dispersant B and the metal [dispersant B/(dispersant B+metal)] in the metal fine particle-containing ink is preferably not less than 0.01, more preferably not less than 0.03 and even more preferably not less than 0.05, and is also preferably not more than 0.3, more preferably not more than 0.2 and even more preferably not more than 0.1, from the viewpoint of improving ordinary-temperature sintering properties of the metal fine particles to thereby improve electrical conductivity of the resulting printed material as well as from the viewpoint of improving dispersion properties of the metal fine particles to thereby improve ejection stability of the resulting metal fine particle-containing ink.

The aforementioned total content of the dispersant B and the metal and the aforementioned mass ratio [dispersant B/(dispersant B+metal)] may be calculated from masses of the dispersant B and the metal which may be measured by the method described in Examples below using a simultaneous thermogravimetry/differential thermal analysis measurement apparatus (TG/DTA).

<Low-Molecular Weight Carboxylic Acid C>

The metal fine particle-containing ink of the present invention contains a low-molecular weight carboxylic acid C from the viewpoint of improving ordinary-temperature sintering properties of the metal fine particles to thereby improve electrical conductivity of the resulting printed material as well as from the viewpoint of improving dispersion properties of the metal fine particles to thereby improve ejection stability of the resulting metal fine particle-containing ink.

The low-molecular weight carboxylic acid C is preferably in the form of a mono- or polycarboxylic acid having not less than 1 and not more than 24 carbon atoms. The low-molecular weight carboxylic acid C may contain a functional group other than a carboxy group. Examples of the functional group include those functional groups that can be coordinated to the metal fine particles, such as an aldehyde group, a functional group containing a halogen atom, a functional group containing at least one hetero atom, such as a hydroxy group, a thiol group, etc., and the like.

Examples of the low-molecular weight carboxylic acid C include carboxylic acids containing an aldehyde group, such as formic acid, a glyoxylic acid, etc.; hydroxycarboxylic acids, such as glycolic acid, lactic acid, etc.; and the like. Among these acids, from the viewpoint of improving ordinary-temperature sintering properties of the metal fine particles to thereby improve electrical conductivity of the resulting printed material as well as from the viewpoint of improving dispersion properties of the metal fine particles to thereby improve ejection stability of the resulting metal fine particle-containing ink, preferred are those acids having reducibility.

When the low-molecular weight carboxylic acid C has reducibility, such a low-molecular weight carboxylic acid C tends to undergo not only discharge from the ink coating film due to drying of the low-molecular weight carboxylic acid C, but also further accelerated discharge from the ink coating film due to oxidation of the low-molecular weight carboxylic acid C on the surface of the respective metal fine particles. As a result, the metal fine particles are allowed to come into contact with each other and undergo ordinary-temperature sintering, so that it is possible to improve ordinary-temperature sintering properties of the metal fine particles and thereby obtain a printed material that has a high electrical conductivity. From this viewpoint, the low-molecular weight carboxylic acid C is more preferably a carboxylic acid containing an aldehyde group, even more preferably at least one compound selected from the group consisting of formic acid and glyoxylic acid, and further even more preferably formic acid.

The boiling point (C) of the low-molecular weight carboxylic acid C as measured under 1 atm satisfies the aforementioned relational formula (I) in relation to the boiling point (D) of the aqueous solvent D from the viewpoint of improving ordinary-temperature sintering properties of the metal fine particles to thereby improve electrical conductivity of the resulting printed material as well as from the viewpoint of improving dispersion properties of the metal fine particles to thereby improve ejection stability of the resulting metal fine particle-containing ink.

From the same viewpoint as described above, the boiling point (C) is preferably higher than 100° C. and more preferably not lower than 100.5° C., and is also preferably not higher than 250° C., more preferably not higher than 200° C., even more preferably not higher than 150° C., further even more preferably not higher than 135° C. and still further even more preferably not higher than 115° C.

The acid dissociation exponent pKa (C) of the low-molecular weight carboxylic acid C satisfies the aforementioned relational formula (II) in relation to the acid dissociation exponent pKa (B) of the acid group in the dispersant B from the viewpoint of improving ordinary-temperature sintering properties of the metal fine particles to thereby improve electrical conductivity of the resulting printed material as well as from the viewpoint of improving dispersion properties of the metal fine particles to thereby improve ejection stability of the resulting metal fine particle-containing ink.

From the same viewpoint as described above, the acid dissociation exponent pKa (C) is preferably not more than 4.5, more preferably not more than 4.0 and even more preferably not more than 3.8, and is also preferably not less than 1.5, more preferably not less than 2.0, even more preferably not less than 2.5 and further even more preferably not less than 3.0.

In addition, the difference $\Delta$pKa (B–C) between the acid dissociation exponent pKa (B) of the acid group in the dispersant B and the acid dissociation exponent pKa (C) of the low-molecular weight carboxylic acid is preferably not less than 0.1, more preferably not less than 0.3 and even more preferably not less than 0.5, and is also preferably not more than 2.0, more preferably not more than 1.5, even more preferably not more than 1.0 and further even more preferably not more than 0.8, from the same viewpoint as described above.

The content of the low-molecular weight carboxylic acid C in the metal fine particle-containing ink is not less than 1% by mass, preferably not less than 2% by mass, more preferably not less than 4% by mass, even more preferably not less than 6% by mass and further even more preferably not less than 8% by mass, and is also not more than 15% by mass, preferably not more than 13% by mass and more preferably not more than 11% by mass, from the viewpoint of improving ordinary-temperature sintering properties of the metal fine particles to thereby improve electrical conductivity of the resulting printed material as well as from the viewpoint of improving dispersion properties of the metal fine particles to thereby improve ejection stability of the resulting metal fine particle-containing ink.

The mass ratio of the low-molecular weight carboxylic acid C to the metal [low-molecular weight carboxylic acid C/metal] in the metal fine particle-containing ink is preferably not less than 0.05, more preferably not less than 0.1 and even more preferably not less than 0.2, and is also preferably not more than 1, more preferably not more than 0.7, even more preferably not more than 0.5 and further even more preferably not more than 0.3, from the same viewpoint as described above.

The content of the low-molecular weight carboxylic acid C and the aforementioned mass ratio [low-molecular weight carboxylic acid C/metal] in the metal fine particle-containing ink may be measured and calculated by the methods described in Examples below.

<Aqueous Solvent D>

The metal fine particle-containing ink of the present invention contains an aqueous solvent D.

The boiling point (D) of the aqueous solvent D as measured under 1 atm satisfies the aforementioned relational formula (I) in relation to the boiling point (C) of the low-molecular weight carboxylic acid C from the viewpoint of improving ordinary-temperature sintering properties of the metal fine particles to thereby improve electrical conductivity of the resulting printed material as well as from the viewpoint of improving dispersion properties of the metal fine particles to thereby improve ejection stability of the resulting metal fine particle-containing ink.

The term "aqueous solvent" as used in the present invention means an organic solvent that is contained in the metal fine particle-containing ink and allowed to be present in the form of a liquid as measured at 25° C., or water.

The boiling point (D) of the aqueous solvent D as measured under 1 atm is preferably not higher than 150° C., more preferably not higher than 130° C., even more preferably not higher than 110° C., further even more preferably not higher than 100° C., still further even more preferably not higher than 90° C., furthermore preferably not higher than 80° C., even furthermore preferably not higher than 70° C. and still even furthermore preferably not higher than 60° C., and is also preferably not lower than 40° C., more preferably not lower than 45° C. and even more preferably not lower than 50° C.

From the same viewpoint as described above, the difference $\Delta$bp(C–D) between the boiling point (C) and the boiling point (D) is preferably not less than 0.5° C., more preferably not less than 1° C., even more preferably not less than 5° C., further even more preferably not less than 10° C., still further even more preferably not less than 20° C. and furthermore preferably not less than 30° C., and is also preferably not more than 70° C., more preferably not more than 65° C. and even more preferably not more than 60° C.

These aqueous solvents D may be used alone or in combination of any two or more thereof.

In the case where two or more aqueous solvents are used as the aqueous solvent D, it is preferred that boiling points of the respective solvents as the aqueous solvent D are lower than the boiling point (C) of the low-molecular weight carboxylic acid C, and the boiling points of the respective solvents as measured under 1 atm fall within the aforementioned range.

Examples of the aqueous solvent D include water; organic solvents, e.g., ketones, such as acetone, methyl ethyl ketone, etc.; ethers, such as tetrahydrofuran, etc.; monohydric aliphatic alcohols, such as ethanol, 2-propanol, etc.; acetic acid alkyl ($C_1$ to $C_3$) esters, such as ethyl acetate, propyl acetate, etc.; and the like. Among these aqueous solvents, from the viewpoint of improving ordinary-temperature sintering properties of the metal fine particles to thereby improve electrical conductivity of the resulting printed material as well as from the viewpoint of improving dispersion properties of the metal fine particles to thereby improve ejection stability of the resulting metal fine particle-containing ink, preferred is at least one solvent selected from the group consisting of water, acetone, methyl ethyl ketone, ethanol and ethyl acetate; more preferred is at least one solvent selected from the group consisting of water, acetone, ethanol and ethyl acetate; even more preferred is at least one solvent selected from the group consisting of acetone, ethanol and ethyl acetate; further even more preferred is at least one solvent selected from the group consisting of acetone and ethyl acetate; and still further even more preferred is acetone.

The content of the aqueous solvent D in the metal fine particle-containing ink is preferably not less than 20% by mass, more preferably not less than 30% by mass and even more preferably not less than 40% by mass, and is also preferably not more than 90% by mass, more preferably not more than 80% by mass and even more preferably not more than 60% by mass, from the viewpoint of improving ordinary-temperature sintering properties of the metal fine particles to thereby improve electrical conductivity of the resulting printed material as well as from the viewpoint of improving dispersion properties of the metal fine particles to thereby improve ejection stability of the resulting metal fine particle-containing ink.

The mass ratio of the low-molecular weight carboxylic acid C to the aqueous solvent D [low-molecular weight carboxylic acid C/aqueous solvent D] in the metal fine particle-containing ink is preferably not less than 0.1, more preferably not less than 0.15 and even more preferably not less than 0.2, and is also preferably not more than 0.7, more preferably not more than 0.5 and even more preferably not more than 0.3, from the same viewpoint as described above.

The content of the aqueous solvent D and the aforementioned mass ratio [low-molecular weight carboxylic acid C/aqueous solvent D] in the metal fine particle-containing ink may be measured and calculated by the methods described in Examples below.

The metal fine particle-containing ink may also contain various additives that may be usually used in metal fine particle-containing inks, such as a polymer dispersant other than the dispersant B, a surfactant, a humectant, a wetting agent, a penetrant, a viscosity modifier, a defoaming agent, an antiseptic agent, a mildew-proof agent, a rust preventive, etc., if required, unless the aforementioned advantageous effects of the present invention are adversely affected by inclusion thereof.

The viscosity of the metal fine particle-containing ink as measured at 32° C. is preferably not less than 0.5 mPa·s, more preferably not less than 1 mPa·s and even more preferably not less than 1.5 mPa·s, and is also preferably not more than 12 mPa·s, more preferably not more than 9 mPa·s and even more preferably not more than 7 mPa·s, from the viewpoint of improving ejection stability of the resulting metal fine particle-containing ink. The viscosity of the metal fine particle-containing ink may be measured using an E-type viscometer.

(Production of Metal Fine Particle-Containing Ink)

The metal fine particle-containing ink of the present invention is preferably produced by preliminarily preparing a metal fine particle dispersion using the aqueous solvent D as a dispersion medium, and then further mixing the low-molecular weight carboxylic acid C, etc., in the metal fine particle dispersion, followed by stirring the resulting mixture. In addition, from the viewpoint of well controlling the solid content of the resulting metal fine particle-containing ink, the aqueous solvent D may be further added to the metal fine particle dispersion, if required.

The metal fine particle dispersion may be obtained by a method (i) of mixing a raw material metal compound A, the polymer dispersant B and a reducing agent with each other to subject the raw material metal compound A to reduction reaction, a method (ii) of adding a dispersion medium to metal fine particles preliminarily prepared by conventionally known methods, followed by mixing the resulting dispersion, and the like. Among these methods, from the viewpoint of improving ordinary-temperature sintering properties of the metal fine particles to thereby improve electrical conductivity of the resulting printed material as well as from the viewpoint of improving dispersion properties of the metal fine particles to thereby improve ejection stability of the resulting metal fine particle-containing ink, preferred is the method (i). By conducting the method (i), the raw material metal compound A is subjected to reduction reaction by the reducing agent so as to form the metal fine particle dispersion containing the metal fine particles (a) which are dispersed therein with the polymer dispersant B.

In the method (i), the raw material metal compound A, the polymer dispersant B and the reducing agent may be mixed with each other by conventionally known methods, in which the order of mixing of the respective components is not particularly limited.

When mixing the respective components in the method (i), a solvent may be further used therein. In the case of using the solvent, the solvent may also be used as a dispersion medium for the resulting metal fine particle dispersion. As the solvent, there may be used the aforementioned aqueous solvent D.

The temperature used upon conducting the reduction reaction is preferably not lower than 10° C., more preferably not lower than 20° C. and even more preferably not lower than 30° C., and is also preferably not higher than 70° C., more preferably not higher than 60° C. and even more preferably not higher than 50° C. The reduction reaction may be conducted either in an atmosphere of air or in an atmosphere of an inert gas, such as nitrogen gas, etc.

[Raw Material Metal Compound A]

The raw material metal compound A is not particularly limited as long as it is a compound containing the aforementioned metal. Examples of the raw material metal compound A include metal salts of inorganic acids or organic acids, metal oxides, metal hydroxides, metal sulfides, metal halides and the like. Specific examples of the aforementioned metal salts include metal salts of inorganic acids, such as nitric acid salts, nitrous acid salts, sulfuric acid salts, carbonic acid salts, ammonium salts, perchloric acid salts, etc.; metal salts of organic acids, such as acetic acid salts, etc.; and the like.

These raw material metal compounds A may be used alone or in the form of a mixture of any two or more thereof.

Among these raw material metal compounds A, preferred is at least one compound selected from the group consisting of metal salts of inorganic acids or organic acids, and metal oxides, more preferred is at least one compound selected from the group consisting of metal salts of nitric acid, and metal oxides, and even more preferred are metal oxides. In the case where the raw material metal compound A is in the form of a metal oxide, no counter ions of the metal ion are contained as impurities in the resulting dispersion, so that it is possible to obtain the metal fine particle dispersion without need of subjecting the dispersion to purification treatment, such as dialysis, etc.

As the metal oxides, preferred are oxides of transition metals belonging to Groups 4 to 11 in the 4th to 6th Periods of the Periodic Table, more preferred are oxides of copper, or noble metals, such as gold, silver, platinum, palladium, etc., even more preferred is an oxide of at least one metal selected from the group consisting of gold, silver, copper and palladium, further even more preferred is at least one metal oxide selected from the group consisting of gold oxide, silver oxide and copper oxide, and still further even more preferred is silver oxide.

[Reducing Agent]

The reducing agent used herein is not particularly limited, and may be either an inorganic reducing agent or an organic reducing agent.

Examples of the organic reducing agent include alcohols, such as ethylene glycol, propylene glycol, etc.; aldehydes, such as formaldehyde, acetaldehyde, propionaldehyde, etc.; acids, such as ascorbic acid, citric acid, etc., and salts thereof; aliphatic amines, e.g., alkanolamines, such as ethanolamine, N-ethyl ethanolamine, N,N-dimethyl ethanolamine (2-(dimethylamino)ethanol), N,N-diethyl ethanolamine, diethanolamine, N-methyl diethanolamine, triethanolamine, propanolamine, N,N-dimethyl propanolamine, butanolamine, hexanolamine, etc., alkyl amines, such as propylamine, butylamine, hexylamine, diethylamine, dipropylamine, dimethylethylamine, diethylmethylamine, triethylamine, etc., (poly)alkylene polyamines, such as ethylenediamine, triethylenediamine, tetramethyl ethylenediamine, diethylenetriamine, dipropylenetriamine, triethylenetetramine, tetraethylenepentamine, etc., and the like; alicyclic amines, such as piperidine, pyrrolidine, N-methyl pyrrolidine, morpholine, etc.; aromatic amines, such as aniline, N-methyl aniline, toluidine, anisidine, phenetidine, etc.; aralkyl amines, such as benzylamine, N-methyl benzylamine, etc.; and the like.

Examples of the inorganic reducing agent include boron hydride salts, such as sodium boron hydride, ammonium boron hydride, etc.; aluminum hydride salts, such as lithium aluminum hydride, potassium aluminum hydride, etc.; hydrazines, such as hydrazine, hydrazine carbonate, etc.; hydrogen gas; and the like.

Incidentally, these reducing agents may be used alone or in combination of any two or more thereof.

The reducing agent is preferably the organic reducing agent, more preferably at least one compound selected from the group consisting of alcohols and amines, even more preferably at least one compound selected from the group consisting of ethylene glycol, propylene glycol and an alkanol amine having not less than 2 and not more than 6 carbon atoms, and further even more preferably at least one compound selected from the group consisting of propylene glycol and N,N-dimethyl ethanolamine.

In the method (i), from the viewpoint of removing impurities, such as the unreacted reducing agent, a surplus of the polymer dispersant B which has no contribution to dispersion of the metal fine particles, etc., the resulting metal fine particle dispersion may be further subjected to purification treatment.

The method of purifying the metal fine particle dispersion is not particularly limited, and there may be used various methods including membrane treatments, such as dialysis, ultrafiltration, etc.; centrifugal separation treatments; and the like. Among these methods, from the viewpoint of efficiently removing the impurities from the resulting dispersion, preferred are the membrane treatments, and more preferred is dialysis. As a material of a dialysis membrane used in the dialysis, there is preferably used a regenerated cellulose.

The molecular weight cutoff of the dialysis membrane is preferably not less than 1,000, more preferably not less than 5,000 and even more preferably not less than 10,000, and is also preferably not more than 100,000 and more preferably not more than 70,000, from the viewpoint of efficiently removing the impurities from the resulting dispersion.

[Method for Producing Printed Material]

A method for producing a printed material according to the present invention is preferably the method including the step of applying the metal fine particle-containing ink onto a printing substrate to form a metal coating film of the ink on the printing substrate under ordinary-temperature environmental conditions, thereby obtaining the printed material.

The sintering temperature used upon forming the metal coating film is preferably in the range of ordinary temperatures from the same viewpoint as described above. More concretely, the sintering temperature is preferably not lower than 5° C., more preferably not lower than 10° C., even more preferably not lower than 15° C. and further even more preferably not lower than 20° C., and is also preferably not higher than 45° C., more preferably not higher than 40° C., even more preferably not higher than 35° C. and further even more preferably not higher than 30° C.

The relative humidity used upon forming the metal coating film is preferably not less than 5% RH, more preferably not less than 10% RH and even more preferably not less than 15% RH, and is also preferably not more than 70% RH, more preferably not more than 60% RH and even more preferably not more than 55% RH, from the same viewpoint as described above.

The sintering atmosphere used upon forming the metal coating film is preferably an atmosphere of air from the viewpoint of discharging the low-molecular weight carboxylic acid from the ink coating film due to oxidation of the low-molecular weight carboxylic acid on the surface of the respective metal fine particles and allowing the metal fine particles to come into contact with each other to thereby subject the metal fine particles to ordinary-temperature sintering.

<Printing Substrate>

The printing substrate used in the present invention may be any of a high-liquid absorbing substrate, a low-liquid absorbing substrate and a non-liquid absorbing substrate.

As the aforementioned printing substrate, there may be mentioned substrates that are formed of various polymers, such as cellulose, polytetrafluoroethylene, oriented polytetrafluoroethylene, polyolefin, polyester, polyamide, polyether, polysulfone, polyethersulfone, polyvinylidene fluoride, polyvinyl chloride, polystyrene, polyethylene, polypropylene, polyacrylonitrile, a (meth)acrylic polymer, polyurethane, etc.; various glass materials; various ceramic materials; or a combination of these materials.

The aforementioned printing substrate may be used in the form of a coated paper, a glossy paper, a plain paper, a glossy film, etc.

According to the printing method of the present invention, it is possible to obtain a printed material that is excellent in ordinary-temperature sintering properties and can exhibit high electrical conductivity. From this viewpoint, the aforementioned printing substrate is preferably a non-liquid absorbing printing substrate.

The method of applying the metal fine particle-containing ink is not particularly limited. Examples of the method of applying the metal fine particle-containing ink include ink-jet printing, screen printing, flexographic printing, gravure printing, offset printing, dispenser printing, slot die coating, dip coating, spray coating, spin coating, doctor blading, knife edge coating, bar coating, and the like. Among these methods, from the viewpoint of improving ejection stability of the resulting metal fine particle-containing ink, preferred is an ink-jet printing method.

More specifically, the metal fine particle-containing ink is preferably used for ink-jet printing.

In the case where the method of applying the metal fine particle-containing ink is the ink-jet printing method, the metal fine particle-containing ink may be loaded to an ink-jet printing apparatus from which droplets of the ink are ejected onto a substrate to form the metal coating film on the substrate. The ink-jet printing apparatus may be of either a thermal type or a piezoelectric type. Among these apparatuses, preferred is an ink-jet printing apparatus of a piezoelectric type.

The temperature of the ink-jet print head is not particularly limited as long as the temperature falls with the range in which the aforementioned metal coating film can be formed on the substrate. From the viewpoint of improving ordinary-temperature sintering properties of the metal fine particles to thereby improve electrical conductivity of the resulting printed material, the temperature of the ink-jet print head is preferably not lower than 15° C., more preferably not lower than 20° C. and even more preferably not lower than 25° C., and is also preferably not higher than 45° C., more preferably not higher than 40° C. and even more preferably not higher than 35° C.

The head voltage applied to the ink-jet print head is preferably not less than 5 V, more preferably not less than 10 V and even more preferably not less than 15 V, and is also preferably not more than 40 V, more preferably not more than 35 V and even more preferably not more than 30 V, from the viewpoint of improving printing efficiency, etc.

The drive frequency of the print head is preferably not less than 1 kHz, more preferably not less than 5 kHz and even more preferably not less than 10 kHz, and is also preferably not more than 50 kHz, more preferably not more than 40 kHz and even more preferably not more than 35 kHz, from the viewpoint of improving printing efficiency, etc.

The amount of droplets of the metal fine particle-containing ink ejected is preferably not less than 5 pL and more preferably not less than 10 pL, and is also preferably not more than 30 pL and more preferably not more than 20 pL, as calculated per one ink droplet ejected, from the viewpoint of maintaining accuracy of impact positions of the ink droplets as well as from the viewpoint of improving ordinary-temperature sintering properties of the metal fine particles to thereby improve electrical conductivity of the resulting printed material.

The amount of the metal fine particle-containing ink applied onto the printing substrate in terms of a solid content thereof is preferably not less than 0.5 g/m$^2$, more preferably not less than 1 g/m$^2$ and even more preferably not less than 2 g/m$^2$, and is also preferably not more than 20 g/m$^2$, more preferably not more than 15 g/m$^2$ and even more preferably not more than 10 g/m$^2$.

The printing resolution is preferably not less than 200 dpi and more preferably not less than 300 dpi, and is also preferably not more than 1,000 dpi, more preferably not more than 800 dpi and even more preferably not more than 600 dpi. Meanwhile, the term "printing resolution" as used in the present specification means the number of dots per 1 inch (2.54 cm) which are formed on the substrate. For example, the "printing resolution of 600 dpi" means that when the ink droplets are ejected onto the printing substrate using a line print head on which nozzles are arranged such that the number of nozzle ports per a length of a nozzle row is 600 dpi (dots/inch), a corresponding dot row of 600 dpi is formed in the direction perpendicular to a transporting direction of the printing substrate, and further when ejecting the ink droplets while moving the printing substrate in the transporting direction thereof, the dot row of 600 dpi is also formed on the printing substrate along the transporting direction thereof. In the present specification, it is assumed that the value of the printing resolution in the direction perpendicular to the transporting direction of the printing substrate is the same as the value of the printing resolution in the transporting direction of the printing substrate.

From the viewpoint of accelerating ordinary-temperature sintering of the metal fine particles to thereby improve electrical conductivity of the resulting printed material, the production method of the present invention preferably includes, after applying the metal fine particle-containing ink to the printing substrate under ordinary-temperature environmental conditions, the drying step of drying the ink coating film on the printing substrate at a temperature equal to the ink-applying temperature or a temperature that falls within an ordinary temperature range and is higher than the ink-applying temperature.

The drying temperature used in the drying step preferably lies within an ordinary temperature range from the viewpoint of accelerating ordinary-temperature sintering of the metal fine particles to thereby improve electrical conductivity of the resulting printed material. More concretely, the drying temperature used in the drying step is preferably not lower than 5° C., more preferably not lower than 10° C., even more preferably not lower than 15° C. and further even more preferably not lower than 20° C., and is also preferably not higher than 45° C., more preferably not higher than 40° C., even more preferably not higher than 35° C. and further even more preferably not higher than 30° C.

The relative humidity used in the drying step is preferably not less than 5% RH, more preferably not less than 10% RH and even more preferably not less than 15% RH, and is also preferably not more than 70% RH, more preferably not more than 60% RH and even more preferably not more than 55% RH, from the same viewpoint as described above.

(Printed Material)

The surface resistivity ρs of the metal coating film formed on the printed material is preferably not more than 10 Ω/□, more preferably not more than 7 Ω/□, even more preferably not more than 5 Ω/□, further even more preferably not more than 3 Ω/□, still further even more preferably not more than 1 Ω/□, furthermore preferably not more than 0.5 Ω/□ and even furthermore preferably not more than 0.1 Ω/□ from the viewpoint of improving electrical conductivity of the resulting printed material, and is also preferably not less than 0.01 Ω/□ from the viewpoint of facilitating production of the printed material.

The aforementioned surface resistivity ρs may be measured by the method described in Examples below.

The metal fine particle-containing ink and the method of producing a printed material using the metal fine particle-containing ink according to the present invention are capable of achieving good ordinary-temperature sintering properties of the metal fine particles as well as excellent electrical conductivity of the resulting printed material, and are therefore useful for production of wiring, electrodes and the like in various application fields. Examples of the applications of the metal fine particle-containing ink and the production method according to the present invention include RFID (radio frequency identifier) tags; capacitors, such as MLCC (multi-layer ceramic capacitor), etc.; electronic papers; image display devices, such as liquid crystal displays, organic EL displays, etc.; organic EL elements; organic transistors; wiring boards, such as printed wiring boards, flexible wiring boards, etc.; organic solar cells; sensors such as flexible sensors, etc.; bonding agents, such as solders, etc.; and the like.

With respect to the aforementioned embodiments, the present invention further provides the following inventive aspects.

<1> A metal fine particle-containing ink that contains metal fine particles (a) dispersed therein with a polymer dispersant B, a low-molecular weight carboxylic acid C and an aqueous solvent D, in which:

the polymer dispersant B contains a constitutional unit derived from an acid group-containing monomer (b-1);

a content of the low-molecular weight carboxylic acid C in the ink is not less than 1% by mass and not more than 15% by mass;

a boiling point (C) of the low-molecular weight carboxylic acid C and a boiling point (D) of the aqueous solvent D satisfy the following relational formula (I); and an acid dissociation exponent pKa (C) of the low-molecular weight carboxylic acid C and an acid dissociation exponent pKa (B) of an acid group in the polymer dispersant B satisfy the following relational formula (II), $$\text{boiling point } (C) > \text{boiling point } (D) \quad (I), \text{ and}$$

$$pKa\ (C) < pKa\ (B) \quad (II).$$

<2> The metal fine particle-containing ink according to the above aspect <1>, wherein the acid dissociation exponent pKa (B) of the acid group in the polymer dispersant B is preferably not less than 2, more preferably not less than 3 and even more preferably not less than 4, and is also preferably not more than 5.5, more preferably not more than 5 and even more preferably not more than 4.5.

<3> The metal fine particle-containing ink according to the above aspect <1> or <2>, wherein the polymer dispersant B is preferably a water-soluble vinyl polymer containing the constitutional unit derived from the acid group-containing monomer (b-1), and more preferably a water-soluble vinyl polymer containing the constitutional unit derived from the acid group-containing monomer (b-1) and a constitutional unit derived from a polyalkylene glycol segment-containing monomer (b-2).

<4> The metal fine particle-containing ink according to any one of the above aspects <1> to <3>, wherein the polymer dispersant B is preferably a water-soluble vinyl polymer that contains a constitutional unit derived from (meth)acrylic acid as the monomer (b-1) and a constitutional unit derived from a polyalkylene glycol monoester of (meth)acrylic acid as the monomer (b-2), and more preferably a water-soluble vinyl polymer that contains the constitutional unit derived from (meth)acrylic acid as the monomer (b-1), the constitutional unit derived from the polyalkylene glycol monoester of (meth)acrylic acid as the monomer (b-2) and a constitutional unit derived from a styrene-based monomer as a monomer (b-3).

<5> The metal fine particle-containing ink according to any one of the above aspects <1> to <4>, wherein the low-molecular weight carboxylic acid C is preferably a mono- or polycarboxylic acid having not less than 1 and not more than 24 carbon atoms, more preferably a carboxylic acid containing an aldehyde group, even more preferably at least one compound selected from the group consisting of formic acid and glyoxylic acid, and further even more preferably formic acid.

<6> The metal fine particle-containing ink according to any one of the above aspects <1> to <5>, wherein the boiling point (C) of the low-molecular weight carboxylic acid C as measured under 1 atm is preferably higher than 100° C. and more preferably not lower than 100.5° C., and is also preferably not higher than 250° C., more preferably not higher than 200° C., even more preferably not higher than 150° C., further even more preferably not higher than 135° C. and still further even more preferably not higher than 115° C.

<7> The metal fine particle-containing ink according to any one of the above aspects <1> to <6>, wherein the acid dissociation exponent pKa (C) of the low-molecular weight carboxylic acid is preferably not more than 4.5, more preferably not more than 4.0 and even more preferably not more than 3.8, and is also preferably not less than 1.5, more preferably not less than 2.0, even more preferably not less than 2.5 and further even more preferably not less than 3.0.

<8> The metal fine particle-containing ink according to any one of the above aspects <1> to <7>, wherein a difference ΔpKa(B−C) between the acid dissociation exponent pKa (B) of the acid group in the polymer dispersant B and the acid dissociation exponent pKa (C) of the low-molecular weight carboxylic acid is preferably not less than 0.1, more preferably not less than 0.3 and even more preferably not less than 0.5, and is also preferably not more than 2.0, more preferably not more than 1.5, even more preferably not more than 1.0 and further even more preferably not more than 0.8.

<9> The metal fine particle-containing ink according to any one of the above aspects <1> to <8>, wherein a content of the low-molecular weight carboxylic acid C in the metal fine particle-containing ink is preferably not less than 2% by mass, more preferably not less than 4% by mass, even more preferably not less than 6% by mass and further even more preferably not less than 8% by mass, and is also preferably not more than 13% by mass and more preferably not more than 11% by mass.

<10> The metal fine particle-containing ink according to any one of the above aspects <1> to <9>, wherein a mass ratio of the low-molecular weight carboxylic acid C to the metal [low-molecular weight carboxylic acid C/metal] in the metal fine particle-containing ink is preferably not less than 0.05, more preferably not less than 0.1 and even more preferably not less than 0.2, and is also preferably not more than 1, more preferably not more than 0.7, even more preferably not more than 0.5 and further even more preferably not more than 0.3.

<11> The metal fine particle-containing ink according to any one of the above aspects <1> to <10>, wherein the boiling point (D) of the aqueous solvent D as measured under 1 atm is preferably not higher than 150° C., more preferably not higher than 130° C., even more preferably not higher than 110° C., further even more preferably not higher than 100° C., still further even more preferably not higher than 90° C., furthermore preferably not higher than 80° C., even furthermore preferably not higher than 70° C. and still even furthermore preferably not higher than 60° C., and is also preferably not lower than 40° C., more preferably not lower than 45° C. and even more preferably not lower than 50° C.

<12> The metal fine particle-containing ink according to any one of the above aspects <1> to <11>, wherein a difference Δbp(C−D) between the boiling point (C) and the boiling point (D) is preferably not less than 0.5° C., more preferably not less than 1° C., even more preferably not less than 5° C., further even more preferably not less than 10° C., still further even more preferably not less than 20° C. and furthermore preferably not less than 30° C., and is also preferably not more than 70° C., more preferably not more than 65° C. and even more preferably not more than 60° C.

<13> The metal fine particle-containing ink according to any one of the above aspects <1> to <12>, wherein the aqueous solvent D is preferably at least one solvent selected from the group consisting of water, acetone, methyl ethyl ketone, ethanol and ethyl acetate, more preferably at least one solvent selected from the group consisting of water, acetone, ethanol and ethyl acetate, even more preferably at least one solvent selected from the group consisting of acetone, ethanol and ethyl acetate, further even more preferably at least one solvent selected from the group consisting of acetone and ethyl acetate, and still further even more preferably acetone.

<14> The metal fine particle-containing ink according to any one of the above aspects <1> to <13>, wherein a content of the aqueous solvent D in the metal fine particle-containing ink is preferably not less than 20% by mass, more preferably not less than 30% by mass and even more preferably not less than 40% by mass, and is also preferably not more than 90% by mass, more preferably not more than 80% by mass and even more preferably not more than 60% by mass.

<15> The metal fine particle-containing ink according to any one of the above aspects <1> to <14>, wherein a mass ratio of the low-molecular weight carboxylic acid C to the aqueous solvent D [low-molecular weight carboxylic acid C/aqueous solvent D] in the metal fine particle-containing ink is preferably not less than 0.1, more preferably not less than 0.15 and even more preferably not less than 0.2, and is also preferably not more than 0.7, more preferably not more than 0.5 and even more preferably not more than 0.3.

<16> The metal fine particle-containing ink according to any one of the above aspects <1> to <15>, wherein the metal constituting the metal fine particles (a) is preferably copper, or a noble metal, such as gold, silver, platinum, palladium, etc., more preferably at least one Group 11 transition metal selected from the group consisting of copper, silver and gold, and even more preferably silver.

<17> The metal fine particle-containing ink according to any one of the above aspects <1> to <16>, wherein an average particle size of the metal fine particles (a) contained in the metal fine particle-containing ink is preferably not less than 5 nm, more preferably not less than 10 nm, even more preferably not less than 15 nm and further even more preferably not less than 20 nm, and is also preferably not more than 100 nm, more preferably not more than 80 nm, even more preferably not more than 60 nm and further even more preferably not more than 40 nm.

<18> The metal fine particle-containing ink according to any one of the above aspects <1> to <17>, wherein a content of the metal in the metal fine particle-containing ink is preferably not less than 1% by mass, more preferably not less than 5% by mass, even more preferably not less than 7% by mass, further even more preferably not less than 10% by mass, still further even more preferably not less than 20% by mass and furthermore preferably not less than 30% by mass, and is also preferably not more than 70% by mass, more preferably not more than 60% by mass and even more preferably not more than 50% by mass.

<19> The metal fine particle-containing ink according to any one of the above aspects <1> to <18>, wherein a total content of the dispersant B and the metal in the metal fine particle-containing ink is preferably not less than 1% by mass, more preferably not less than 5% by mass, even more preferably not less than 7% by mass, further even more preferably not less than 10% by mass, still further even more preferably not less than 20% by mass and furthermore preferably not less than 30% by mass, and is also preferably not more than 78% by mass, more preferably not more than 70% by mass, even more preferably not more than 60% by mass and further even more preferably not more than 50% by mass.

<20> The metal fine particle-containing ink according to any one of the above aspects <1> to <19>, wherein a mass ratio of the dispersant B to a sum of the dispersant B and the metal [dispersant B/(dispersant B+metal)] in the metal fine particle-containing ink is preferably not less than 0.01, more preferably not less than 0.03 and even more preferably not less than 0.05, and is also preferably not more than 0.3, more preferably not more than 0.2 and even more preferably not more than 0.1.

<21> The metal fine particle-containing ink according to any one of the above aspects <1> to <20> for use in ink-jet printing.

<22> A method for producing the metal fine particle-containing ink according to any one of the above aspects <1> to <21>, including the steps of dispersing the metal fine particles (a) in the aqueous solvent D as a dispersion medium with the polymer dispersant B to prepare a metal fine particle dispersion containing the metal fine particles (a), and then further mixing the low-molecular weight carboxylic acid C in the metal fine particle dispersion.

<23> The method for producing the metal fine particle-containing ink according to the above aspect <22>, wherein the metal fine particle dispersion is obtained by a method of mixing a raw material metal compound A, the polymer dispersant B and a reducing agent to subject the raw material metal compound A to reduction reaction.

<24> The method for producing the metal fine particle-containing ink according to the above aspect <23>, wherein the raw material metal compounds A is preferably at least one compound selected from the group consisting of metal salts of inorganic acids or organic acids, and metal oxides, more preferably at least one compound selected from the group consisting of metal salts of nitric acid, and metal oxides, and even more preferably a metal oxide.

<25> The method for producing the metal fine particle-containing ink according to the above aspect <24>, wherein the metal oxide is preferably an oxide of a transition metal belonging to Groups 4 to 11 in the 4th to 6th Periods of the Periodic Table, more preferably an oxide of copper, or a noble metal, such as gold, silver, platinum, palladium, etc., even more preferably an oxide of at least one metal selected from the group consisting of gold, silver, copper and palladium, further even more preferably at least one metal oxide selected from the group consisting of gold oxide, silver oxide and copper oxide, and still further even more preferably silver oxide.

<26> The method for producing the metal fine particle-containing ink according to any one of the above aspects <23> to <25>, wherein the reducing agent is preferably an organic reducing agent, more preferably at least one compound selected from the group consisting of alcohols and amines, even more preferably at least one compound selected from the group consisting of ethylene glycol, propylene glycol and an alkanol amine having not less than 2 and not more than 6 carbon atoms, and further even more preferably at least one compound selected from the group consisting of propylene glycol and N,N-dimethyl ethanolamine.

<27> A method for producing a printed material, including the step of applying the metal fine particle-containing ink according to any one of the above aspects <1> to <21> to a printing substrate to form a metal coating film of the ink on the printing substrate under ordinary-temperature environmental conditions, thereby obtaining the printed material.

<28> The method for producing a printed material according to the above aspect <27>, wherein a sintering temperature used upon forming the metal coating film is preferably in the range of ordinary temperatures, and the sintering temperature is more preferably not lower than 5° C., even more preferably not lower than 10° C., further even more preferably not lower than 15° C. and still further even more preferably not lower than 20° C., and is also more preferably not higher than 45° C., even more preferably not higher than 40° C., further even more preferably not higher than 35° C. and still further even more preferably not higher than 30° C.

<29> The method for producing a printed material according to the above aspect <27> or <28>, wherein a sintering atmosphere used upon forming the metal coating film is an atmosphere of air.

<30> The method for producing a printed material according to any one of the above aspects <27> to <29>, wherein the printing substrate is a substrate that is formed of various polymers, such as cellulose, polytetrafluoroethylene, oriented polytetrafluoroethylene, polyolefin, polyester, polyamide, polyether, polysulfone, polyethersulfone, polyvinylidene fluoride, polyvinyl chloride, polystyrene, polyethylene, polypropylene, polyacrylonitrile, a (meth) acrylic polymer, polyurethane, etc.; various glass materials; various ceramic materials; or a combination of these materials.

<31> The method for producing a printed material according to any one of the above aspects <27> to <30>, wherein the printing substrate is a non-liquid absorbing printing substrate.

<32> The method for producing a printed material according to any one of the above aspects <27> to <31>, wherein a method of applying the metal fine particle-containing ink is preferably at least one method selected from the group consisting of ink-jet printing, screen printing, flexographic printing, gravure printing, offset printing, dispenser printing, slot die coating, dip coating, spray coating, spin coating, doctor blading, knife edge coating and bar coating, and more preferably an ink-jet printing method.

<33> The method for producing a printed material according to any one of the above aspects <27> to <32>, wherein a surface resistivity ps of the metal coating film formed on the printed material is preferably not more than 10 Ω/□, more preferably not more than 7 Ω/□, even more preferably not more than 5 Ω/□, further even more preferably not more than 3 Ω/□, still further even more preferably not more than 1 Ω/□, furthermore preferably not more than 0.5 Ω/□ and even furthermore preferably not more than 0.1 Ω/□, and is also preferably not less than 0.01 Ω/□.

EXAMPLES

In the following Production Examples, Examples and Comparative Examples, the "part(s)" and "%" indicate "part(s) by mass" and "% by mass", respectively, unless otherwise specified.

(1) Measurement of Content of Metal and Content of Polymer Dispersant B in Metal Fine Particle-Containing Ink or Metal Fine Particle Dispersion Using a simultaneous thermogravimetry/differential thermal analysis (TG/DTA) measurement apparatus "STA7200RV" (tradename) available from Hitachi High-Tech Science Corporation, 10 mg of the metal fine particle-containing ink or the metal fine particle dispersion as a sample to be measured was weighed in an aluminum pan cell, and heated from 35° C. to 550° C. at a temperature rise rate of 10° C./min to measure a reduced mass of the sample under an air flow of 50 mL/min.

The reduced mass of the sample as measured in a temperature range of from 35° C. to 230° C. was defined as a mass of the ink solvent or dispersion medium, the reduced mass of the sample as measured in a temperature range of from 230° C. to 550° C. was defined as a mass of the dispersant B, and a mass of the residue at 550° C. was defined as a mass of the metal, to calculate a content (%) of the metal and a content (%) of the dispersant B in the metal fine particle-containing ink or the metal fine particle dispersion.

(2-1) Qualitative Analysis of Respective Components in Metal Fine Particle-Containing Ink The qualitative analysis of the respective components in the metal fine particle-containing ink was carried out using a gas chromatograph (GC). The measuring conditions used in the analysis were as follows.

GC: "Agilent 6890N Network GC" available from Agilent Technologies, Inc.

Hydrogen generator: "HG26S" available from GL Sciences Inc.

GC temperature conditions: After maintaining a sample to be measured at 40° C. for 5 minutes, the sample was heated from 40° C. to 240° C. at a temperature rise rate of 10° C./min, and maintained at 240° C. for 5 minutes.

Sample to be measured: The sample used herein was prepared by mixing 0.1 g of the metal fine particle-containing ink or the metal fine particle dispersion with 9.9 g of acetone, stirring the resulting mixture at 25° C. for 10 hours with a magnetic stirrer, and then subjecting the mixture to filtration treatment through a syringe filter "DISMIC-13HP" (PTFE; 0.2 μm) available from Advantec Co., Ltd.

Detection times for standard samples: 5.87 min for formic acid; 6.97 min for glyoxylic acid; 11.47 min for acetic acid; 2.48 min for acetone.

(2-2) Meaurement of Contents of Respective Components in Metal Fine Particle-Containing Ink or Metal Fine Particle Dispersion The contents of respective components, such as the low-molecular weight carboxylic acid C, the aqueous solvent D, etc., in the metal fine particle-containing ink were quantitativbely determined by the following method using $^1$H-NMR.

(Measuring Conditions)

Measuring device: "FT-NMR Mercury-400" available from Varian, Inc.

Nucleus measured: $^1$H

Sample to be measured: The sample used herein was prepared by mixing 0.2 g of the metal fine particle dispersion with 1.0 g of the below-mentioned heavy water containing an internal standard.

Magnetic field strength: 14.09637 [T]

Frequency of scanning: 16 times

Measuring temperature: 30° C.

Relaxation time: 45 sec (Preparation of Heavy Water Containing Internal Standard)

TSP (sodium 3-(trimethylsilyl)propionate-2,2,3,3-d4) was weighed in an amount of 0.1 g in a 100 mL measuring flask, and then heavy water was added to the measuring flask until the contents of the measuring flask reached 100 mL. The contents of the measuring flask were allowed to stand overnight to completely dissolve solid components therein, thereby preparing heavy water containing TSP as an internal standard.

(Quantitative Determination of Contents of Respective Components in Metal Fine Particle-Containing Ink or Metal Fine Particle Dispersion)

The contents of the respective components in the metal fine particle-containing ink or the metal fine particle dispersion were quantitatively determined from integrated values of proton signals of the respective components on the basis of the obtained $^1$H-NMR spectrum. The quantitative determination was carried out using the integrated value of δ 7.9 ppm (for formyl protons of formic acid), the integrated value of δ 9.5 ppm (for formyl protons of glyoxylic acid), and the integrated value of δ 1.8 ppm (for acetyl protons of acetic acid) assuming that TSP was δ 0 ppm.

(3) Measurement of Average Particle Size of Metal Fine Particles (a)

The dispersion of the metal fine particles (a) as a sample to be measured was subjected to cumulant analysis using a laser particle analyzing system "ELSZ-2000ZS" available from Otsuka Electrics Co., Ltd., to measure a cumulant average particle size of the particles. The measurement was conducted under the conditions including a temperature of 25° C., an angle between incident light and detector of 90° and a cumulative number of 100 times, and a refractive index of water (1.333) was input to the analyzing system as a refractive index of the dispersion medium. The concentration of the sample to be measured was adjusted to 5×10$^{-3}$% by mass (in terms of a solid content thereof).

Example 1

(1) Production of Metal Fine Particle-Containing Ink 1

A 1-L PYREX (registered trademark) glass spinner flask with side arms was charged with 100 g of an aqueous solution (having a solid content of 40%) of an acrylic acid/maleic acid/alkoxy (polyethylene glycol/polypropylene glycol)acrylate (number of alkyleneoxide units: 32 mol; molar ratio [EP/PO]=75/25)/styrene/a-methyl styrene copolymer "DISPERBYK-2015" (tradename: acid value: 24 mgKOH/g; Mn: 4,500) available from BYK Chemie GmbH as the polymer dispersant B and 600 g of propylene glycol as the reducing agent, and the contents of the flask were stirred with a magnetic stirrer at an ordinary temperature (25° C.; in the following Examples, etc., the ordinary temperature indicates 25° C.) for 0.5 hour. Thereafter, while stirring the contents of the flask with the magnetic stirrer, 500 g of silver oxide (guaranteed reagent) available from FUJIFILM Wako Pure Chemical Corporation as the raw material metal compound A was gradually charged into the flask over 5 minutes, followed by further stirring the contents of the flask at an ordinary temperature for 0.5 hour to prepare a slurry. Then, the flask filled with the slurry was dipped in a water bath at 40° C. After the inside temperature of the flask reached 40° C., the slurry was stirred for 24 hours, and then air-cooled, thereby obtaining a silver fine particle dispersion liquid in the form of a dark brown liquid.

The thus obtained silver fine particle dispersion liquid was charged into a dialysis tube "Spectra/Por 6" (tradename; dialysis membrane: regenerated cellulose; molecular weight cutoff (MWCO)=50 K) available from Spectrum Laboratories Inc., and the dialysis tube was hermetically sealed with closers at opposite upper and lower ends thereof. The thus closed dialysis tube was dipped in 5 L of acetone filled in a 5 L glass beaker, and then the dispersion liquid was stirred for 1 hour while maintaining a temperature of the dispersion liquid in the range of 20 to 25° C. Thereafter, the whole amount of the acetone was replaced with new one every one hour, and after the replacement procedure was repeated three times, the resulting dispersion was stored for 24 hours to complete the dialysis treatment, thereby obtaining a silver fine particle dispersion whose dispersion medium was replaced with acetone.

The thus obtained silver fine particle dispersion was mixed with formic acid as the low-molecular weight carboxylic acid C to obtain a mixture, and the resulting mixture was transferred into a 1-L eggplant-shaped flask. Then, the mixture was concentrated using a rotary distillation apparatus "Rotary Evaporator N-1000S" available from Tokyo Rikakikai Co., Ltd., operated at a rotating speed of 50 r/min in a warm water bath adjusted at 75° C. under the pressure reduced to 0.07 MPa (abs) until a solid content of the mixture was increased to 43.4% by mass, thereby obtaining a metal fine particle-containing ink I-1.

(2) Production of Printed Material by Ink-Jet Printing Method

Under the atmospheric air condition of a temperature of 25±1° C. and a relative humidity of 30±5% RH, the ink I-1 was loaded into an ink-jet print evaluation apparatus available from Trytech Co., Ltd., equipped with an ink-jet print head "KJ4B-QA06NTB-STDV" (tradename; piezoelectric type; number of nozzles: 2,656) available from Kyocera Corporation.

The printing conditions were set to a head applied voltage of 26 V, a head frequency of 20 kHz, an ejected ink droplet amount of 18 pL, a head temperature of 32° C., a printing resolution of 600 dpi, the number of ink shots for flushing before being ejected of 200 shots and a negative pressure of −4.0 kPa, and a printing substrate was fixed on a transportation table under reduced pressure such that a longitudinal direction of the printing substrate was aligned with a transportation direction thereof. A printing command was transmitted to the aforementioned print evaluation apparatus to conduct printing by a single pass mode at Duty 100% under the atmospheric air condition of a temperature of 25±1° C. and a relative humidity of 30±5% RH, followed by drying the resulting printed substrate for 30 minutes under the atmospheric air condition of a temperature of 25° C. and a relative humidity of 50% RH, thereby obtaining a printed material on which a metal coating film was formed.

As the printing substrate, there was used a polyester film "LUMIRROR T60" (tradename; thickness: 75 μm; water absorption: 2.3 g/m$^2$) available from Toray Industries Inc.

Examples 2 to 4

The same procedure as in Example 1(1) was repeated except that the dispersion medium of the resulting silver fine particle dispersion was replaced with the respective aqueous solvents D shown in Table 1, thereby obtaining respective inks I-2 to I-4. Then, the same procedure as in Example 1(2) was repeated except that the ink I-1 was replaced with the thus obtained respective inks I-2 to I-4, thereby obtaining respective printed materials.

Example 5

The same procedure as in Example 1(1) was repeated except that the formic acid as the low-molecular weight carboxylic acid C to be added to the silver fine particle dispersion was replaced with glyoxylic acid, thereby obtaining an ink I-5. Then, the same procedure as in Example 1(2) was repeated except that the ink I-1 was replaced with the thus obtained ink I-5, thereby obtaining a printed material.

Comparative Example 1

The same procedure as in Example 1(1) was repeated except that no formic acid as the low-molecular weight carboxylic acid C was added, thereby obtaining an ink I-C1. Then, the same procedure as in Example 1(2) was repeated except that the ink I-1 was replaced with the thus obtained ink I-C1, thereby obtaining a printed material Comparative Example 2

The same procedure as in Example 1(1) was repeated except that the acetone as the dispersion medium of the resulting silver fine particle dispersion was replaced with isobutanol used as the aqueous solvent D, thereby obtaining an ink I-C2. Then, the same procedure as in Example 1(2) was repeated except that the ink I-1 was replaced with the thus obtained ink I-C2, thereby obtaining a printed material Comparative Examples 3 and 4

The same procedure as in Example 1(1) was repeated except that the amount of the formic acid as the low-molecular weight carboxylic acid C was changed to those shown in Table 1, thereby obtaining respective inks I-C3 and I-C4. Then, the same procedure as in Example 1(2) was repeated except that the ink I-1 was replaced with the thus obtained respective inks I-C3 and I-C4, thereby obtaining respective printed materials.

Comparative Example 5

The same procedure as in Example 1(1) was repeated except that the formic acid was replaced with acetic acid, thereby obtaining an ink I-C5. Then, the same procedure as in Example 1(2) was repeated except that the ink I-1 was replaced with the thus obtained ink I-C5, thereby obtaining a printed material.

Comparative Example 6

The same procedure as described in Example 1 of the Patent Literature (JP 2009-74171A) was repeated to prepare the silver fine particle dispersion liquid which was used herein as an ink I-C6.

More specifically, 66.8 g of silver nitrate, 7.2 g of an aqueous solution (having a solid content of 40%) of an acrylic acid/maleic acid/styrene/alkoxy (polyethylene glycol/polypropylene glycol) acrylate (number of alkyleneoxide units: 32 mol; molar ratio [EP/PO]=75/25) copolymer "DISPERBYK-190" (tradename) available from BYK Chemie GmbH as a polymer dispersant and 1.8 g of cholic acid available from FUJIFILM Wako Pure Chemical Corporation were added to 100 g of ion-exchanged water, and the resulting mixture was vigorously stirred, thereby obtaining a suspension. After gradually adding 100 g of dimethylaminoethanol available from FUJIFILM Wako Pure Chemical Corporation to the thus obtained suspension, the resulting mixture was heated while stirring for 4 hours in a water bath whose water temperature was adjusted to 50° C. The thus obtained reaction solution was subjected to filtration treatment through a glass fiber filter paper "GC-90" (tradename) available from ADVANTEC TOYO KAISHA, LTD., thereby obtaining a silver fine particle dispersion liquid containing 15% of silver.

Then, the same procedure as in Example 1(2) was repeated except that the ink I-1 was replaced with the thus obtained silver fine particle dispersion liquid used herein as an ink I-C6, thereby obtaining a printed material.

TABLE 1

Metal fine particle-containing ink

| | | Ink composition | | | | | | | | Average particle size | | |
|---|---|---|---|---|---|---|---|---|---|---|---|---|
| | | Polymer dispersant B | | Low-molecular weight carboxylic acid C | | | | Aqueous solvent D | | (nm) of metal fine particles (a) in ink | Δbp (C · D) (° C.) | ΔpKa (B · C) |
| | Kind | Metal Content (%) | pKa (B) | Content (%) | Kind | pKa (C) | Boiling point (° C.) | Content (%) | Kind | Boiling point (D) (° C.) | Content (%) | | | |
| Example 1 | I-1 | 40 | 4.35 | 3.4 | Formic acid | 3.77 | 100.8 | 10 | Acetone | 56.0 | 46.6 | 31 | 44.8 | 0.58 |
| Example 2 | I-2 | 40 | 4.35 | 3.4 | Formic acid | 3.77 | 100.8 | 10 | Ethanol | 78.0 | 46.6 | 31 | 22.8 | 0.58 |
| Example 3 | I-3 | 40 | 4.35 | 3.4 | Formic acid | 3.77 | 100.8 | 10 | Ethyl acetate | 77.1 | 46.6 | 31 | 23.7 | 0.58 |
| Example 4 | I-4 | 40 | 4.35 | 3.4 | Formic acid | 3.77 | 100.8 | 10 | Water | 100.0 | 46.6 | 31 | 0.8 | 0.58 |
| Example 5 | I-5 | 40 | 4.35 | 3.4 | Glyoxylic acid | 3.18 | 111.0 | 10 | Acetone | 56.0 | 46.6 | 31 | 55.0 | 1.17 |
| Comparative Example 1 | I-C1 | 40 | 4.35 | 3.4 | — | — | — | 0 | Acetone | 56.0 | 56.6 | 31 | — | — |
| Comparative Example 2 | I-C2 | 40 | 4.35 | 3.4 | Formic acid | 3.77 | 100.8 | 10 | Isobutanol | 108.0 | 46.6 | 31 | −7.2 | 0.58 |
| Comparative Example 3 | I-C3 | 40 | 4.35 | 3.4 | Formic acid | 3.77 | 100.8 | 0.5 | Acetone | 56.0 | 56.1 | 31 | 44.8 | 0.58 |

TABLE 1-continued

Metal fine particle·containing ink

| | Ink composition | | | | | | | | | | | Average particle size (nm) of metal fine particles (a) in ink | Δbp (C·D) (° C.) | ΔpKa (B·C) |
|---|---|---|---|---|---|---|---|---|---|---|---|---|---|---|
| | Metal | | Polymer dispersant B | | Low·molecular weight carboxylic acid C | | | | Aqueous solvent D | | | | | |
| | Kind | Content (%) | pKa (B) | Content (%) | Kind | pKa (C) | Boiling point (C) (° C.) | Content (%) | Kind | Boiling point (D) (° C.) | Content (%) | | | |
| Comparative Example 4 | I-C4 | 40 | 4.35 | 3.4 | Formic acid | 3.77 | 100.8 | 20 | Acetone | 56.0 | 36.6 | 31 | 44.8 | 0.58 |
| Comparative Example 5 | I-C5 | 40 | 4.35 | 3.4 | Acetic acid | 4.76 | 118.0 | 10 | Acetone | 56.0 | 46.6 | 31 | 62.0 | −0.41 |
| Comparative Example 6 | I-C6 | 15 | 4.35 | 1.6 | Cholic acid | 4.98 | None | 0.6 | Water | 100.0 | 82.8 | 68 | — | −0.63 |

The respective printed materials obtained in the aforementioned Examples and Comparative Examples were evaluated with respect to ordinary-temperature sintering properties of the metal fine particles used therein by measuring surface resistivity of the metal coating film formed thereon as well as ejection stability of the respective inks used therein, by the following methods. The results are shown in Table 2.

<Measurement of Surface Resistivity>

The respective printed materials obtained in the aforementioned Examples and Comparative Examples were cut vertically from one side surface thereof opposed to the other side surface thereof on which the metal coating film was formed, using a stainless steel razor (76 razor for ordinary use; blade thickness: 76 μm) available from FEATHER Safety Razor Co., Ltd., to thereby obtain a cut sample having a size of 1 cm×2 cm.

Then, the surface resistivity (Ω/□) of the thus obtained cut sample was measured by a resistivity meter (body: "Loresta-GP"; four-point probe: PSP probe, both available from Mitsubishi Chemical Analytech Co., Ltd.), and the value of the thus measured surface resistivity was rounded to the third decimal place. The measurement of the surface resistivity was conducted at 10 positions in total of the cut sample in the same manner as described above to determine a surface resistivity ρs (Ω/□) of the metal coating film formed on the printed material as an arithmetic mean of the thus measured 10 values. The lower the surface resistivity ρs becomes, the more excellent the ordinary-temperature sintering properties is. Incidentally, the symbol "OL" shown in Table 2 indicates that the surface resistivity value exceeds the upper limit of the measurement.

<Evaluation of Ejection Stability>

After conducting the printing using the aforementioned ink-jet print evaluation apparatus, the apparatus was allowed to stand for 60 minutes without protecting an ink-jet nozzle face thereof. Thereafter, a print check pattern capable of judging ejection or non-ejection of the ink from all of ink-jet nozzles of the apparatus was printed on a printing substrate, and the number of missing nozzles (corresponding to the number of nozzles from which the ink could not be normally ejected) was counted to evaluate ejection stability of the ink.

The less the number of missing nozzles becomes, the more excellent the ejection stability of the ink is.

TABLE 2

| | Metal fine particle-containing ink | Evaluation | |
|---|---|---|---|
| | | Ordinary-temperature sintering properties Surface resistivity ρs (Ω/□) of metal coating film on PET film | Ejection stability Number of missing nozzles |
| Example 1 | I-1 | 0.040 | 0 |
| Example 2 | I-2 | 9.800 | 3 |
| Example 3 | I-3 | 1.100 | 2 |
| Example 4 | I-4 | 4.900 | 4 |
| Example 5 | I-5 | 0.065 | 3 |
| Comparative Example 1 | I-C1 | OL | 1 |
| Comparative Example 2 | I-C2 | 57.000 | 2 |
| Comparative Example 3 | I-C3 | 92.000 | 6 |
| Comparative Example 4 | I-C4 | 22.400 | 27 |
| Comparative Example 5 | I-C5 | 11.200 | 2 |
| Comparative Example 6 | I-C6 | 102.000 | 31 |

From Table 2, it was confirmed that the metal fine particle-containing inks obtained in Examples 1 to 5 had a low surface resistivity ρs of the metal coating film formed on the resulting respective printed materials and were excellent in ordinary-temperature sintering properties of the metal fine particles therein, as compared to the inks obtained in Comparative Examples 1 to 6. In addition, it was confirmed that all of the metal fine particle-containing inks obtained in Examples 1 to 5 exhibited a less number of missing nozzles, and therefore were also excellent in ejection stability.

On the other hand, it was confirmed that since the metal fine particle-containing ink obtained in Comparative Example 1 contained no low-molecular weight carboxylic acid C, the metal coating film produced therefrom had a surface resistivity more than the upper limit of the measurement, and failed to undergo ordinary-temperature sintering, so that the ink was incapable of forming a metal coating film having a good electrical conductivity.

It was confirmed that in the case of the metal fine particle-containing inks obtained in Comparative Examples 2 to 5, since the polymer dispersant B, the low-molecular weight carboxylic acid C and the aqueous solvent D failed to satisfy the specific relationships between the physicochemical characteristic values and amounts thereof, the resulting inks were deteriorated in ordinary-temperature sintering properties.

From Comparative Example 6, it was confirmed that the silver fine particle dispersion liquid obtained according to Example 1 of the Patent Literature 1 was insufficient in ordinary-temperature sintering properties.

INDUSTRIAL APPLICABILITY

According to the present invention, it is possible to obtain a printed material on which a metal coating film that is excellent in ordinary-temperature sintering properties and has a high electrical conductivity is formed, and therefore the metal fine particle-containing ink of the present invention can be suitably used for forming wiring, electrodes, etc., in various application fields. In addition, the metal fine particle-containing ink of the present invention is also excellent in ejection stability, and therefore is especially suitably used for ink-jet printing.

The invention claimed is:

1. A metal fine particle-containing ink, comprising:
   metal fine particles (a) dispersed therein with a polymer dispersant B,
   a low-molecular weight carboxylic acid C, and
   an aqueous solvent D,
   wherein:
   the polymer dispersant B comprises a constitutional unit derived from an acid group-containing monomer (b-1);
   a content of the low-molecular weight carboxylic acid C in the ink is not less than 1% by mass and not more than 15% by mass;
   a boiling point (C) of the low-molecular weight carboxylic acid C and a boiling point (D) of the aqueous solvent D satisfy the following relational formula (I); and
   an acid dissociation exponent pKa (C) of the low-molecular weight carboxylic acid C and an acid dissociation exponent pKa (B) of an acid group in the polymer dispersant B satisfy the following relational formula (II), boiling point $(C)$>boiling point $(D)$ (I), and pKa $(C)$<pKa $(B)$ (II).

2. The metal fine particle-containing ink according to claim 1, wherein the low-molecular weight carboxylic acid C comprises an aldehyde group.

3. The metal fine particle-containing ink according to claim 1, wherein the boiling point (D) of the aqueous solvent D as measured under 1 atm is not higher than 150° C.

4. The metal fine particle-containing ink according to claim 1, wherein the aqueous solvent D is at least one compound selected from the group consisting of acetone, ethanol, and ethyl acetate.

5. The metal fine particle-containing ink according to claim 1, wherein a metal constituting the metal fine particles (a) is silver.

6. The metal fine particle-containing ink according to claim 1, wherein the low-molecular weight carboxylic acid C is at least one compound selected from the group consisting of formic acid and glyoxylic acid.

7. The metal fine particle-containing ink according to claim 1, wherein the acid dissociation exponent pKa (B) of the acid group in the polymer dispersant B is not less than 2 and not more than 5.5.

8. The metal fine particle-containing ink according to claim 1, wherein the polymer dispersant B is a water-soluble vinyl polymer that comprises the constitutional unit derived from the acid group-containing monomer (b-1).

9. The metal fine particle-containing ink according to claim 1, wherein the boiling point (C) of the low-molecular weight carboxylic acid C as measured under 1 atm is higher than 100° C. and not higher than 250° C.

10. The metal fine particle-containing ink according to claim 1, wherein the acid dissociation exponent pKa (C) of the low-molecular weight carboxylic acid is not less than 1.5 and not more than 4.5.

11. The metal fine particle-containing ink according to claim 1, wherein an average particle size of the metal fine particles (a) in the metal fine particle-containing ink is not less than 5 nm and not more than 100 nm.

12. The metal fine particle-containing ink according to claim 1, wherein a content of the metal in the metal fine particle-containing ink is not less than 1% by mass and not more than 70% by mass.

13. A method for producing a printed material, comprising:
    applying the metal fine particle-containing ink of claim 1 onto a printing substrate to form a metal coating film of the ink on the printing substrate under ordinary-temperature environmental conditions, thereby obtaining the printed material.

14. The method for producing a printed material according to claim 13, wherein a sintering atmosphere upon forming the metal coating film is an atmosphere of air.

15. The metal fine particle-containing ink according to claim 1, wherein a mass ratio of the low-molecular weight carboxylic acid C to the metal [low-molecular weight carboxylic acid C/metal] in the metal fine particle-containing ink is not less than 0.05 and not more than 1.

16. The metal fine particle-containing ink according to claim 1, wherein a mass ratio of the low-molecular weight carboxylic acid C to the aqueous solvent D [low-molecular weight carboxylic acid C/aqueous solvent D] in the metal fine particle-containing ink is not less than 0.1 and not more than 0.7.

17. The metal fine particle-containing ink according to claim 1, wherein a difference $\Delta bp(C-D)$ between the boiling point (C) and the boiling point (D) is not less than 0.5° C. and not more than 70° C.

18. The metal fine particle-containing ink according to claim 1, wherein a difference $\Delta pKa(B-C)$ between the acid dissociation exponent pKa (B) of the acid group in the polymer dispersant B and the acid dissociation exponent pKa (C) of the low-molecular weight carboxylic acid is not less than 0.1 and not more than 2.0.

19. The metal fine particle-containing ink according to claim 1, wherein the polymer dispersant B is a water-soluble vinyl polymer comprising the constitutional unit derived from the acid group-containing monomer (b-1) and a constitutional unit derived from a polyalkylene glycol segment-containing monomer (b-2).

* * * * *